INVENTORS
REGIS LAFAY
FRIEDRICH WIEGANDT

# United States Patent Office 3,560,585
Patented Feb. 2, 1971

3,560,585
CRYSTALLIZATION PROCESS
Regis Lafay, Suresnes, France, and Friedrich Wiegandt, Ithaca, N.Y., assignors to Institut Francais du Petrole, des Carburants et Lubrifiants, Rueil Malmaison, France
Filed Jan. 17, 1968, Ser. No. 698,618
Claims priority, application France, Jan. 23, 1967, 92,199
Int. Cl. C07c 7/14
U.S. Cl. 260—674                                    15 Claims

ABSTRACT OF THE DISCLOSURE

A process for selectively crystallizing one of the constituents of a liquid feed mixture containing several constituents and an apparatus for performing the crystallization process. The process comprises passing a feed mixture and an immiscible cooling liquid in countercurrent contact to each other, to cause crystallization of the constituent in the feed mixture. The crystals are passed to a purification zone suspended in melted crystals which were used to wash other crystals in the purification zone.

---

Figure 1:
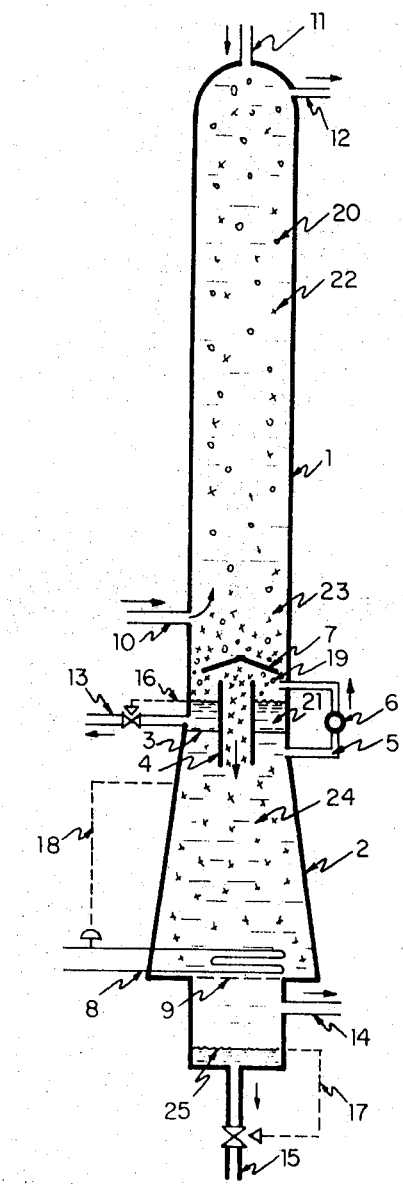

This invention relates to an improved crystallization process, in which a crystallizable constituent can be obtained in a substantially pure state from a liquid mixture of this constituent with other constituents, these other constituents being less easily crystallizable by cooling than the required constituent.

Several processes are known wherein the controlled cooling of a liquid mixture of several constituents results in the crystallization of one of these constituents, practically free of other constituents, provided this cooling is not too strong.

However these processes exhibit several inconveniences at various degrees, particularly a poor thermal yield, an insufficient purity of the obtained crystallized products and/or a great technical complexity.

According to a first known process (U.S. Pat. No. 2,912,469 filed Mar. 16, 1955 the specification of which is included herein by way of reference), the crystallization is carried out by direct counter-current contact between (a) a feed liquid containing several crystallizable constituents, and (b) an immiscible liquid the density of which differs from those of the feed liquid and the crystals to be formed, this immiscible liquid being introduced at a sufficiently low temperature to allow the formation of crystals of a crystallizable constituent, however over the temperature which would lead to the crystallization of all crystallizable constituents. There is separated the liquid impoverished of crystallizable constituent, on the one part, and the immiscible liquid, on the other part. The crystals accumulate as a bed in a purification zone; they are melted progressively by their basis and the melted crystals are contacted with the newly formed crystals so as to wash the latter and purify them, the thus used crystals being conveyed thereafter into the crystallization zone, whereas the obtained washed crystals are melted and constitute the pure desired product.

In a specific embodiment, the contact is carried out in a vertical cylindrical column, between an ascending liquid mixture of organic substances which constitute the continuous phase and a dispersed aqueous brine of higher density than those of the liquid mixture and the crystals to be obtained therefrom, the liquid mixture and the melted crystals being however less dense than the solid crystals.

The bed of crystals floats on the surface of the phase of immiscible liquid accumulating at the foot of the column. A heating grid allows the melting of the crystals at the foot of this bed, and one part of the melted crystals rises in opposite direction to that of the accumulating crystals, washing the latter, whereas the other part of the melted crystals is taken off at the level of the grid to constitute the expected pure product.

This apparatus allows to obtain the crystallizable constituent in a rather pure state, however it exhibits several inconveniences:

The height of the purification zone must be high;
The degree of purity is not satisfactory for some uses, and this is thought to be attributable to the fact that the descending current of brine mixes up the bed of crystals and thus opposes to a good washing by the ascending current of melted crystals;
The thermal yield is low, since the brine which is obliged to go through the bed of melted crystals and pass along the heated grid, goes out at a rather high temperature and must be cooled down thoroughly before being recycled as cooling agent.

A second known process also makes use of a crystallization by direct thermal contact between a mixture which contains the component to be selectively crystallized and the immiscible cooling liquid, the contact being however co-current; in fact in this process jets of the two liquids are admixed therebetween, these liquids as well as the crystals formed during the contact falling down by gravity to the bottom of the crystallization device.

At this point the heavier immiscible refrigerant separates and goes out; the suspension of crystals in the mixture impoverished in crystallizable component, which is over the heavy phase, is then passed to a purification zone where the impoverished mixture is filtered and the crystals are washed and melted.

This process also exhibits some inconveniences: the crystallization is sudden and not complete, which results in crystals of insufficient purity since impurities are imprisoned during this sudden crystallization.

The height of the purification zone must be also rather high.

The thermal yield is rather low as will be pointed out in the comparative experiments given hereafter.

These defects may be avoided or at least strongly reduced by the improved process of this invention.

According to this process, there is carried out a selective crystallization of one of the constituents of a liquid mixture of several substances, said process comprising introducing said mixture into an elongated and upright crystallization zone which exhibits two ends, at an intermediate point thereof, said mixture forming a continuous phase in said zone, introducing at the higher end of this crystallization zone an immiscible cooling liquid which flows down in dispersed form to the lower end of this zone, in countercurrent contact with the continuous phase so as to obtain a partial crystallization of the initial liquid mixture, withdrawing the continuous phase of the liquid mixture impoverished in one of its constituents from the higher end of the zone, causing the crystals to fall by gravity in the same direction as the cooling liquid to the lower end of the zone, separating by decantation the immiscible cooling liquid at the lower end of said zone where it forms a continuous phase with a bed of crystals floating thereon, withdrawing the continuous phase of the cooling liquid, passing the crystals of the bed, practically free of cooling liquid and impoverished liquid, however suspended in a liquid defined hereafter, from the said bed to the higher end of an elongated end upright purification zone where the crystals accumulate, melting the crystals at the bottom of the purification zone, partially withdrawing the melted crystals from the lower end of said zone, flowing up the unwithdrawn part of the melted crystals through said purification zone to wash the crystals in counter-current, then passing the resulting unwithdrawn part to the lower"

end of the crystallization zone, as suspending liquid for the crystals.

According to a preferred embodiment, the part of the melt which has washed the crystals in counter-current and is passed to the lower end of the crystallization zone is 0.1 to 2 times the amount of liquid withdrawn from the lower end of the purification zone. Preferably the purification zone exhibits an increasing cross-section towards bottom.

Figures 2, 3:
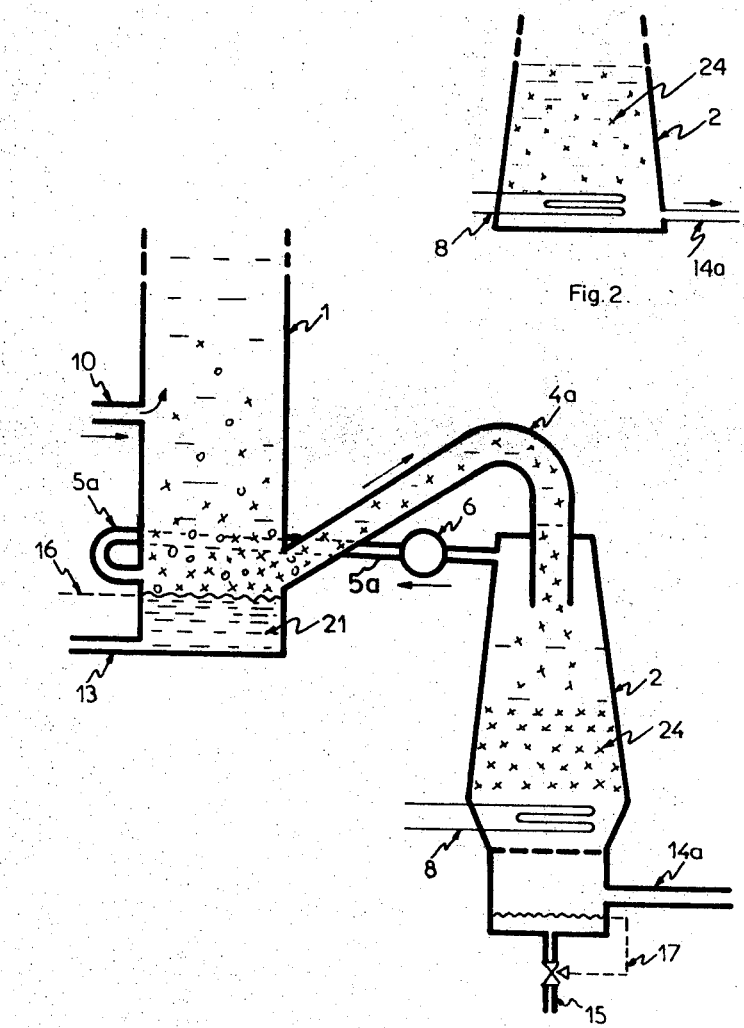

This invention will be described hereafter by means of FIGS 1 to 3, given by way of illustration and not of limitation.

FIG. 1 shows a first embodiment of this invention.
FIG. 2 is a modified device for purifying the crystals.
FIG. 3 shows another change in the device where the crystallization and purification zones are separated one from the other.

The device of FIG. 1 comprises a substantially vertical contact zone or column 1 in free communication at its lower end with a purification zone 2, of vertical axis through at least one duct 4 in rigid connection with the enclosure by means of a tight surface 3. The two zones are also connected through duct 5 containing a pump 6. A cap 7, wider than the duct 4, however less wide than the column 1, is placed over the duct 4, however not obturating the latter.

At the lower part of the purification device 2, there is provided a heating device 8, for example a tube heated by a flowing liquid or an electric resistance.

The shape of the enclosure 2 is preferably frustoconical widening towards bottom, although a cylindrical shape may also be used for moderate heights, for example lower than 2 times the average diameter, which allow a less thorough purification. For larger heights the bed tends to block itself.

There is also used a grid 9 to bear the bed of crystal, as well as pipes 10 to 15 and level regulating means 16, 17 and 18.

The apparatus may be used as follows:

The apparatus is initially full of feed liquid mixture which has been introduced, for example, through feed pipe 10 and will be withdrawn through pipe 12, whereas the immiscible cooling liquid is introduced through pipe 11. Since the latter liquid is heavier than the feed mixture, it flows down through zone 1 as droplets such as 19 and 20. Since the cap 7 protects the duct 4, the droplets form a continuous liquid phase 21 the higher level of which is maintained lower than the higher end of duct 4, due to level-controlling means 16 regulating for example the withdrawal rate of the coolant through duct 13.

The obtained crystals such as 22 and 23 also fall down through the column since they have a higher density than that of the feed liquid of duct 10. The feed rate in pipes 10 and 12 is not too high to avoid any carrying away of crystals through pipe 12, however sufficient to ensure a good hourly production. The feed rate of the coolant and the temperature of the latter are chosen in view of obtaining the crystallization of the major part of the desired crystallizable component, whereas other undesired crystallizable components cannot crystallize.

The crystals assemble on the surface of the liquid phase 21 on which they tend to float; then they fall into duct 4 and form a bed 24 initially containing some feed liquid. The pipe 8 is then heated in order to melt the crystals. The fusion liquid progressively replaces the initial feed liquid and forms 2 currents. The first one goes up through the bed of crystals 24 and washes the latter in counter-current contact. It is withdrawn through pipe 5 and is sent through pump 6 towards the higher part of the apparatus, either in the upper contact zone or preferably at the level of cap 7. This liquid is then used in part to carry the crystals into pipe 4 from the top to the bottom thereof. A rather intense circulation of liquid may be made through pipes 4 and 5, in order to favor the entrainment of crystals towards the purification zone 2.

The second current of melted crystals goes through the filter 9 and is withdrawn through pipe 14. It constitutes the desired product. If traces of coolant have been carried along, together with the crystals, into enclosure 2, these form a separate phase 25 at the bottom of the device, and said phase is withdrawn through pipe 15 at a rate ordered by the level-sensing means 17.

The top of the bed of crystals is maintained at a constant level in the purification zone by means of a level-detecting device 18, said level being located at a sufficient height to obtain the desired purification by washing of the bed.

It is not necessary, however, to separate at this stage the melt from the carried out coolant, and the device of FIG. 2 may be used, for instance, wherein the second current of melted crystals is withdrawn through duct 14a, together with the optional traces of coolant.

On FIG 3, the purification zone 2 is materially separated from the contact zone 1.

The duct 5a is used to inject the melt of crystals into the bottom of column 1, which melt carries along the crystals into pipe 4a towards the purification device 2. The cap 7 may be omitted.

Many changes may be brought to the above-described device without changing the nature thereof. These changes are also part of this invention.

Also for starting the device, other means may be used. For example, it will be possible to fill up the device with a melt of the crystals, or otherwise the crystals may be introduced into the device and melted thereafter. Other modifications will be apparent to those skilled in the art.

For a more detailed description of the cooling liquids, the mixtures to be crystallized and other details not given here, reference is made to U.S.P. 2,912,469.

This process is of special interest for fractionating mixtures which are not easily separable by other methods, for instance for fractionating compounds not easily separable by distillation, particularly the isomers of position such as the ortho, meta and para isomers of disubstituted benzenes, the substituents being for example chlorine, methyl and the like. The process may also be used to crystallize and separate solid paraffins, and/or to separate aromatic hydrocarbons from their mixtures with paraffins.

The following non-limitative examples are given by way of illustration.

EXAMPLE 1

There is used as feed a mixture of the xylenes containing 70.1% by weight of paraxylene. The coolant is an aqueous solution of calcium chloride of 27% by weight concentration, with a specific weight of 1.25 g./ccm. at 20° C., introduced at a temperature of −14.5° C. The crystals formed in the crystallization zone accumulate in the melting zone as a bed which is maintained at a convenient height. The washing of this bed by means of a part of the melt increases its purity. In continuous operation, the following results are obtained: the mother-liquor issues at −11° C. with a content of 54% by weight of paraxylene and paraxylene is withdrawn with a purity of 97.85% by weight.

EXAMPLE 2

There is used the same process as in Example 1, except that the feed mixture contains 79% by weight of paraxylene. The temperature of the introduced brine is −15° C. A mother-liquor is obtained at −7° C., containing 61.2% by weight of paraxylene. Paraxylene is obtained with a purity of 99.75% by weight.

EXAMPLE 3

This example relates to the separation by crystallization of benzene from a mixture of benzene with n-heptane.
An apparatus is used of the type shown on FIG. 1.
The operating conditions are the following:
The feed mixture containing 62% by weight of benzene is introduced through pipe 10 into the crystallization column at a temperature of −14° C. As coolant there is used brine introduced at −42° C. through pipe 11 into the top of the column.

The impoverished mother-liquor is withdrawn through pipe 12; it contains only 30% by weight of benzene and its temperature is −35° C.

The suspension of crystals in the recycle liquid of pipe 5 is at −15° C. This suspension passes through duct 4 into the purification zone 2 where the crystals accumulate and are then washed and melted. The resulting melt, comprising 99.9% by weight of benzene, issues through duct 14 at a temperature of about +5.5° C.

The yield of benzene is 51.5%.

By way of comparison, the second well-known process mentioned hereabove has been used.

A co-current contact is carried out between the mixture benzene-heptane, the cooling liquid and the formed crystals, i.e. the feed mixture is introduced as a jet at the top of the column through duct 11, and the immiscible cooling liquid is introduced laterally as a jet, for example through pipe 12. Brine is the same as in Example 3. Deflecting means could be used in order to improve the contact between the two liquids. Contrary to Example 3, there is no continuous phase over the level of cap 7, and only droplets of liquids and crystals falling by gravity.

The mixture of the two liquids and the crystals falls down to the bottom of the crystallization zone 1, where the coolant is decanted and withdrawn through pipe 13. The crystals suspended in the impoverished organic solution pass to the lower stage, through duct 4, into the purification zone 2. A two-stages lateral filter allows the withdrawal from the higher stage of the impoverished organic liquor. This filter is placed in the higher first third of the purification zone 2.

The crystals accumulate in this zone and are melted from their basis as previously. One part of the melt is withdrawn through pipe 14 whereas the other part is used to wash the crystals counter-currently; this other part is withdrawn through the lower stage of the filter.

Of course duct 10 is not used since duct 5 is used to withdraw and recycle the filtered liquids through the two stages mentioned hereabove. These liquids are the impoverished mother liquor on the one hand and one part of the melt of the crystals on the other hand. One part of the filtrate of these two stages is recycled to the feed pipe for the column (pipe 11).

All other conditions being the same as in Example 3 (feed rates of the organic phase and the coolant, temperatures and concentrations at the inlet of the crystallization zone), the following results are obtained:

The melt issuing from the purification zone at a temperature of about 5.5° C., contains only 99% by weight of benzene (as compared to the 99.9% of Example 3), The suspension of crystals in the impoverished organic liquor in pipe 4 is at the temperature of −30° C., This organic liquor filtrated in the first stage contains 38% by weight of benzene.

Taking into account the feed rates and the concentrations, it is found that the yield of benzene is 38%.

This makes apparent the advantages of this invention: with a same feed and a same coolant, at the same temperature, there is obtained much purer benzene (99.9% instead of 99%) with a much higher yield.

Further the power required to melt the crystals is reduced with respect to that required in the comparative experiment.

There results that the coolant is withdrawn at a temperature which is lower than the melting point of the crystals, and that the crystals, in the melting zone, carry along only a minimal amount of the cooling liquid.

We claim:

1. Process for selectively crystallizing one of the constituents of a liquid mixture of several substances, comprising introducing said mixture into an elongated and upright crystallization zone which exhibits two ends, at an intermediate point thereof, said mixture forming a continuous phase in said zone, introducing at the higher end of this crystallization zone an immiscible cooling liquid which flows down in dispersed form to the lower end of this zone, in counter-current contact with the continuous phase so as to obtain a partial crystallization of the initial liquid mixture, withdrawing the continuous phase of the liquid mixture impoverished in one of its constituents from the higher end of the zone, causing the crystals to fall by gravity in the same direction as the cooling liquid to the lower end of the zone, separating by decantation the immiscible cooling liquid at the lower end of said zone where it forms a continuous phase with a bed of crystals floating thereon, withdrawing the continuous phase of the cooling liquid, passing the crystals of the bed, practically free of cooling liquid and impoverished liquid, however suspended in a liquid defined hereafter, from the said bed to the higher end of an elongated and erected purification zone where the crystals accumulate, melting the crystals at the bottom of the purification zone, partially withdrawing the melted crystals from the lower end of said zone, flowing up the unwithdrawn part of the melted crystals through said purification zone to wash the crystals in counter-current, then passing the resulting unwithdrawn part to the lower end of the crystallization zone, as suspending liquid for the crystals.

2. Process according to claim 1, wherein the part of the melted product which washes counter-currently the crystals represents from 0.1 to 2 times the other part which is withdrawn as product.

3. Process according to claim 1, wherein the liquid mixture comprises a mixture of the xylenes.

4. Apparatus for carrying the process of claim 1 to practice, comprising a crystallizer consisting of an upright enclosure and a purifier consisting of an upright enclosure, at least one feed pipe for the mixture of substances at an intermediary point of the crystallizer, at least one withdrawal pipe for the impoverished mixture at the higher part of the crystallizer, at least one feed pipe for the cooling liquid at the higher part of the crystallizer, at least one withdrawal pipe for the cooling liquid at the lower part of the crystallizer, at least one outlet pipe for the crystals connecting the lower part of the crystallizer to the higher part of the purifier, heating and melting means for the crystals at the lower part of the purifier, at least one pipe for the withdrawal of one part of the melt and at least one pipe for recycling one other part of the melt from the higher part of the purifier to the lower part of the crystallizer.

5. Apparatus as claimed in claim 4, further comprising deflecting means over the outlet pipe for the crystals.

6. Apparatus as claimed in claim 1, wherein the recycle pipe opens in the crystallizer substantially at the level of opening of the pipe for withdrawal of the crystals.

7. Apparatus as claimed in claim 4, wherein the crystallizer is placed over the purifier, these two apparatus being in solid relation with respect to one another and the outlet pipe for the crystals being interior to the combination of the two apparatus and having a cross-section lower than the cross-section of each apparatus.

8. A crystallization apparatus which comprises a crystallization chamber and a purification chamber, channel means providing communication between said crystallization chamber and said purification chamber, the opening of said channel means which communicates with the crystallization chamber being disposed above the bottom of said crystallization chamber, first inlet means for introducing a cooling liquid into said crystallization chamber disposed above said opening of said channel means, second inlet means for introducing a feed liquid to said crystallization chamber disposed between said first inlet means and said opening of said channel, first outlet means for removing said cooling liquid from said crystallization chamber disposed below said outlet of said channel, second outlet means for removing said feed liquid from said crystallization chamber disposed between said first and second inlet means, heating means disposed near the bottom of said purification zone, third outlet means disposed near the bottom of said purification zone for removing the purified product, and means for recycling a portion of the material in said purification chamber to a lower portion of said crystallization chamber.

9. A crystallization apparatus as defined in claim 8, wherein the channel means terminates in an upper portion of said purification zone.

10. A crystallization apparatus as defined in claim 8, wherein said crystallization and purification chambers are contained in an elongated vessel, said crystallization chamber being disposed above said purification chamber and separated by a wall means, said channel means passing through said wall means, and having a baffle means disposed above said outlet of said channel.

11. A crystallization apparatus according to claim 8, further comprising first and second liquid level control means connected to said first outlet means and said heating means, respectively.

12. A crystallization apparatus according to claim 8, wherein said third outlet means includes a means to separate cooling liquid from said purified product.

13. A process for selectively crystallizing one of the constituents of a liquid feed mixture of several substances which comprises introducing said feed mixture into a crystallization zone in which said feed mixture forms a continuous phase, partially crystallizing said one constituent by introducing an immiscible cooling liquid having a higher density than said feed mixture into said crystallization zone at a point higher than the point at which said feed mixture is introduced, collecting said immiscible cooling liquid at the bottom of said crystallization zone and forming a continuous phase on which the crystals of said partially crystallized one constituent collect, withdrawing the feed mixture impoverished in said constituent from said crystallization zone at a point higher than the point at which the feed mixture was introduced, withdrawing the cooling liquid from the bottom of said crystallization zone while maintaining a continuous phase of said cooling liquid at the bottom of said crystallization zone, withdrawing from said crystallization zone the crystals which collect on said continuous phase of said cooling liquid and introducing them into a purification zone, melting said crystals at the bottom of said purification zone, withdrawing a portion of said melted crystals from said purification zone, countercurrently washing the crystals introduced into said purification zone with the remaining portion of said melted crystals, then recycling said remaining portion of said melted crystals into the lower end of said crystallization zone, said crystals are conveyed from said crystallization zone to said purification zone suspended in said recycled melted crystals substantially free of said feed mixture and said cooling liquid.

14. A process according to claim 13, wherein said feed mixture is a mixture of xylenes and the constituent to be crystallized is paraxylene.

15. A process according to claim 13, wherein said feed mixture is a mixture of benzene and n-heptane and the constituent to be crystallized is benzene.

References Cited

UNITED STATES PATENTS

| 2,890,938 | 6/1959 | Rush | 260—674X |
| 2,910,516 | 10/1959 | Rush | 260—674 |
| 3,092,673 | 6/1963 | Rush | 260—674 |

CURTIS R. DAVIS, Primary Examiner

U.S. Cl. X.R.

23—273; 62—58; 260—707